(12) United States Patent
Karakayis

(10) Patent No.: US 12,511,994 B2
(45) Date of Patent: Dec. 30, 2025

(54) VEHICLE CONTROL SYSTEM AND METHOD FOR GENERATING SPEED LIMIT SIGNAL

(71) Applicant: JAGUAR LAND ROVER LIMITED, Warwickshire (GB)

(72) Inventor: Adil Karakayis, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 233 days.

(21) Appl. No.: 18/245,165

(22) PCT Filed: Sep. 14, 2021

(86) PCT No.: PCT/EP2021/075228
§ 371 (c)(1),
(2) Date: Mar. 14, 2023

(87) PCT Pub. No.: WO2022/053713
PCT Pub. Date: Mar. 17, 2022

(65) Prior Publication Data
US 2023/0360524 A1    Nov. 9, 2023

(30) Foreign Application Priority Data

Sep. 14, 2020   (GB) ..................................... 2014437

(51) Int. Cl.
*G08G 1/0962* (2006.01)
*B60W 30/14* (2006.01)
(Continued)

(52) U.S. Cl.
CPC ....... *G08G 1/09623* (2013.01); *B60W 30/146* (2013.01); *B60W 30/18154* (2013.01);
(Continued)

(58) Field of Classification Search
None
See application file for complete search history.

(56) References Cited

U.S. PATENT DOCUMENTS 10,354,156 B2 * 7/2019 Nishimura ........... G06V 20/582
2014/0327772 A1 * 11/2014 Sahba ..................... B60R 11/04
348/148
(Continued)

FOREIGN PATENT DOCUMENTS

CN          107273816       10/2017
JP          2017067464 A     4/2017
(Continued)

OTHER PUBLICATIONS

Office Action Summary for JP Application No. 2023-516625 dated Apr. 2, 2024.
(Continued)

*Primary Examiner* — Todd Melton
(74) *Attorney, Agent, or Firm* — Carlson, Gaskey & Olds, P.C.

(57) ABSTRACT

A control system and method for control system for generating a speed limit signal for controlling a vehicle is configured to receive, from one or more imaging devices associated with the vehicle, image data indicative of an environment of the vehicle. The control system is configured to determine, in dependence on the image data, a speed limit indicated by a traffic sign and a location of the traffic sign with respect to a road feature in the environment. A relevance of the speed limit to the vehicle is determined in dependence on the determined location of the traffic sign and a determined location of the vehicle. A sign speed limit signal indicative of the speed limit is selectively generated in dependence on the determined relevance, and output to at least one vehicle control system.

15 Claims, 9 Drawing Sheets

(51) Int. Cl.
*B60W 30/18* (2012.01)
*G06V 20/58* (2022.01)

(52) U.S. Cl.
CPC ....... *G06V 20/582* (2022.01); *G08G 1/09626* (2013.01); *B60W 2420/403* (2013.01); *B60W 2552/20* (2020.02); *B60W 2555/60* (2020.02); *B60W 2556/45* (2020.02)

(56) References Cited

U.S. PATENT DOCUMENTS

| | | |
|---|---|---|
| 2015/0345974 A1 | 12/2015 | Takahashi |
| 2016/0332517 A1 | 11/2016 | Fujimaki |
| 2017/0148320 A1 | 5/2017 | Ro |
| 2018/0225530 A1 | 8/2018 | Kunze et al. |

FOREIGN PATENT DOCUMENTS

| | | |
|---|---|---|
| JP | 2018047795 A | 3/2018 |
| JP | 2019146012 A | 8/2019 |
| JP | 2019172253 A | 10/2019 |
| JP | 2019212189 A | 12/2019 |

OTHER PUBLICATIONS

International Search Report and Written Opinion of the International Searching Authority for International application No. PCT/EP2021/075228 dated Oct. 25, 2021.
Combined Search and Examination Report under Sections 17 and 18(3) for Application No. GB2014437.4 dated Sep. 7, 2021.
Chinese Office Action for Chinese Patent Application No. 202180062482.1 mailed Nov. 20, 2025.

* cited by examiner

VEHICLE CONTROL SYSTEM AND METHOD FOR GENERATING SPEED LIMIT SIGNAL

TECHNICAL FIELD

The present disclosure relates to the generation of a speed limit signal. Aspects of the invention relate to a control system for generating a speed limit signal, to a vehicle, and to a computer-implemented method for generating a speed limit signal.

BACKGROUND

Traffic Sign Recognition (TSR) systems in vehicles are designed to recognize upcoming traffic signs such that vehicle systems may be updated or controlled accordingly. Said traffic signs include speed limit signs. Recognition of speed limit signs may be used to update or override a speed limit extracted from map data, such as when temporary speed limit restrictions are in place. The recognition of speed limit signs may also be used to provide speed limit information where no speed limit is available from the map data, for example because the vehicle is on a road segment which is not present in the map data.

TSR systems operate by recognising, if possible, all traffic signs in image footage or video data indicating the environment ahead of the vehicle. However, some traffic signs identified may not be applicable to the road on which the vehicle is travelling. Incorrect identification of oncoming speed limit signs may be inconvenient for the vehicle driver.

It is an aim of the present invention to address one or more of the disadvantages associated with the prior art.

SUMMARY OF THE INVENTION

Aspects and embodiments of the invention provide a control system, a vehicle, and a computer-implemented method as claimed in the appended claims.

According to an aspect of the invention there is provided a control system for generating a speed limit signal for controlling a vehicle, the control system comprising one or more controllers. The control system is configured to receive, from one or more imaging devices associated with the vehicle, image data indicative of an environment of the vehicle; determine, in dependence on the image data, a speed limit indicated by a traffic sign and a location of a traffic sign with respect to an edge of the road on which the vehicle is located; determine a relevance of the speed limit to the vehicle in dependence on the determined location of the traffic sign with respect to the edge of the road and a determined location of the vehicle; selectively generate a sign speed limit signal indicative of the speed limit in dependence on the determined relevance; and output the selectively generated signal to at least one vehicle control system. Advantageously, the proximity of the traffic sign to the road edge may be used to determine whether the traffic sign is applicable to the road on which the vehicle is located. Thus, speed limit signs that are not relevant may be filtered.

According to a further aspect there is provided a control system for generating a speed limit signal for controlling a vehicle, the control system comprising one or more controllers. The control system is configured to receive, from one or more imaging devices associated with the vehicle, image data indicative of an environment of the vehicle; determine, in dependence on the image data, a speed limit indicated by a traffic sign and a location of the traffic sign with respect to an entrance stub to a side road; determine a relevance of the speed limit to the vehicle in dependence on the determined location of the traffic sign with respect to the entrance stub and a determined location of the vehicle; selectively generate a sign speed limit signal indicative of the speed limit in dependence on the determined relevance; and output the selectively generated signal to at least one vehicle control system. Advantageously, the proximity of the traffic sign to an entrance to a side road may be used to determine whether the traffic sign is applicable to the road on which the vehicle is located. Thus, speed limit signs that are not relevant may be filtered.

According to a further aspect there is provided a control system for generating a speed limit signal for controlling a vehicle, the control system comprising one or more controllers. The control system is configured to receive, from one or more imaging devices associated with the vehicle, image data indicative of an environment of the vehicle; determine, in dependence on the image data, a speed limit indicated by a traffic sign and a location of the traffic sign with respect to a further traffic sign indicative of the speed limit; determine a relevance of the speed limit to the vehicle in dependence on the determined location of the traffic sign with respect to the further traffic sign and a determined location of the vehicle; selectively generate a sign speed limit signal indicative of the speed limit in dependence on the determined relevance; and output the selectively generated signal to at least one vehicle control system. Advantageously, the pairing of the traffic sign with another traffic sign, and the location of said pair may be used to determine whether the traffic sign is applicable to the road on which the vehicle is located. Thus, speed limit signs that are not relevant may be filtered.

According to a further aspect there is provided a control system for generating a speed limit signal for controlling a vehicle, the control system comprising one or more controllers. The control system is configured to receive, from one or more imaging devices associated with the vehicle, image data indicative of an environment of the vehicle; determine, in dependence on the image data, a speed limit indicated by the traffic sign and a location of a traffic sign with respect to a road feature in the environment; determine a relevance of the speed limit to the vehicle in dependence on the determined location of the traffic sign and a determined location of the vehicle; selectively generate a sign speed limit signal indicative of the speed limit in dependence on the determined relevance; and output the selectively generated signal to at least one vehicle control system. Advantageously, an identified road feature may be used to determine whether the traffic sign is applicable to a road on which the vehicle is located. Thus, speed limit signs that are not relevant may be filtered.

The selectively generated signal may be output to be displayed to the user to inform the user of the relevant speed limit. The selectively generated signal may be output to adjust a cruise control system of the vehicle. Additionally, or alternatively, the selectively generated signal may be output to a warning system to provide a warning to the driver, for example to warn the driver they are exceeding the relevant speed limit.

Determining a relevance may comprise classifying the speed limit as relevant or not relevant to the vehicle. The determined relevance may be indicative of a likelihood that the traffic sign is associated with a road segment on which the vehicle is located or a road segment on which the vehicle will be located based on a predicted path of the vehicle. The speed limit may be classified as not relevant in dependence on a likelihood that the traffic sign is applicable to a side road on which the vehicle is not located. The sign speed limit signal may be selectively output in dependence on the speed limit being determined to be relevant. Optionally, the sign speed limit signal may be selectively output in dependence on the speed limit being determined to be relevant to a characteristic of the vehicle. For example, it may be determined that the traffic sign is applicable to the road segment on which the vehicle is located but only relevant for vehicles having certain characteristics, such as vehicles over a certain size.

Optionally, the control system is configured to receive digital map data comprising an indication of a map speed limit associated with a road segment on which the vehicle is located. In dependence on the speed limit indicated by the traffic sign being determined to be not relevant, the control system may be configured to generate a map speed limit signal indicative of the map speed limit and output the map speed limit signal to the at least one vehicle control system. If the speed limit indicated by the traffic sign is determined to be relevant, the control system may be configured to preferentially output the sign speed limit signal. Beneficially, only the speed limit indicated by relevant road signs may override the speed limit indicated by map data.

Optionally, determining the location of the traffic sign comprises determining a distance from the traffic sign to the road feature. The relevance of the speed limit may be determined in dependence on whether the distance meets a predetermined criterion, such as a minimum or maximum distance.

According to an embodiment, the road feature comprises an edge of the road on which the vehicle is located. The road on which the vehicle is located and/or the road on which the vehicle is predicted to be located given its trajectory may be referred to henceforth as a primary road. Any road aside from the primary road may be referred to henceforth as a side road. The side road may be any road on which the vehicle is not located. The side road may for example be a road branching from or intersecting the primary road, or a road that does not meet the primary road. For example, the side road may comprise a road substantially parallel to the primary road. The control system may be configured to determine a distance from the traffic sign to the edge of the primary road. Optionally, the distance is a lateral distance. The lateral distance may be defined as a distance taken substantially perpendicular to the road edge. Beneficially, the lateral distance at which a traffic sign is positioned from the road edge is largely standardised for a given geographic area, for example for a given country.

The control system may be configured to determine the speed limit to be not relevant to the vehicle if the determined distance to the edge of the road is greater than a predetermined threshold. The predetermined threshold may be set in dependence on the standardised distance for the geographic area in which the vehicle is located. Advantageously, filtering traffic signs for which the lateral distance exceeds this threshold effectively filters traffic signs that are positioned too far from the road edge and thus are unlikely to be applicable to the road on which the vehicle is located.

According to an embodiment, the at least one road feature comprises an entrance stub to a side road. An entrance stub may be defined as a point at which the side road branches or deviates from the primary road. The entrance stub may be any junction, such as a turn-off, a roundabout exit, or an intersection.

The control system may be configured to determine the location of the traffic sign by determining a stub distance from the traffic sign to the entrance stub of the side road. Beneficially, proximity to the entrance stub indicates a likelihood that the traffic sign is applicable to the side road and thus not relevant to the vehicle.

Optionally, the control system is configured to receive digital map data indicative of a map speed limit associated with the side road and determine the speed limit to be not relevant if the speed limit matches the map speed limit associated with the side road and the stub distance is less than a predetermined stub distance threshold. Beneficially, the traffic sign may only then be disregarded as not relevant if the speed limit matches what would be expected as applicable to the side road based on the digital map data. In this way, traffic signs applicable to the primary road which coincidentally occur proximal to the entrance stub of the side road are not erroneously deemed not relevant.

According to an embodiment, the road feature comprises a further traffic sign indicative of the speed limit. The control system may be configured to determine whether the traffic sign and the further traffic sign span a side road in dependence on the location of the traffic sign with respect to the further traffic sign. By span a side road, it is meant the traffic sign and further traffic sign respectively lie to either side of the side road at a given location. The control system may be configured to determine the speed limit to be not relevant if the traffic sign and further traffic sign span the side road. Advantageously, the presence of a sign on each side of a road indicates that the signs are associated with the road running between them. Thus, if the sign and the further sign span a side road, the sign may be effectively filtered as not relevant to the primary road.

Optionally, the traffic sign and further traffic sign may be determined to span a side road if the traffic sign and the further traffic sign are each offset to a first side of a path of the vehicle. Optionally, the traffic sign and further traffic sign are only determined to span a side road if a distance between the traffic sign and the further traffic sign is greater than a predetermined minimum distance. Optionally, the traffic sign and further traffic sign may only be determined to span a side road if a distance between the traffic sign and the further traffic sign is less than a predetermined maximum distance.

Optionally, the or each controller comprises an electrical input for receiving an electrical signal indicative of the image data, an electrical output for outputting an electrical signal indicative of the speed limit, and one or more electronic processors for operatively executing computer-readable instructions to determine the relevance of the speed limit.

According to another aspect of the invention there is provided a vehicle comprising a control system as described above.

According to a further aspect, there is provided a computer-implemented method for generating a speed limit signal for control of a vehicle, the method comprising receiving, from one or more imaging devices associated with the vehicle, image data indicative of an environment of the vehicle; determining, in dependence on the image data, a speed limit indicated by the traffic sign and a location of a traffic sign with respect to a road feature in the environment, determining a relevance of the speed limit to the vehicle in dependence on the determined location of the traffic sign and a determined location of the vehicle, selectively generating a sign speed limit signal indicative of the speed limit in dependence on the determined relevance; and outputting the selectively generated signal to at least one vehicle control system.

Optionally, the method comprises: receiving digital map data comprising an indication of a map speed limit associated with a road segment on which the vehicle is located; and if the speed limit indicated by the traffic sign is determined to be not relevant, generating a map speed limit signal indicative of the map speed limit and outputting the map speed limit signal to the at least one vehicle control system. The method may comprise preferentially outputting the sign speed limit signal in dependence on the traffic sign being determined to be relevant.

Optionally, determining the location of the traffic sign comprises determining a distance from the traffic sign to the road feature.

The road feature may comprise an edge of the road on which the vehicle is located, and identifying the location of the traffic sign comprises determining a distance from the traffic sign to the edge of the road; and the method may comprise determining the speed limit to be not relevant to the vehicle if the determined distance to the edge of the road is greater than a predetermined threshold.

Optionally, the at least one road feature may comprise an entrance stub to a side road, and wherein determining the location of the traffic sign may comprise determining a stub distance from the traffic sign to the entrance stub of the side road.

Optionally, the method may comprise receiving digital map data indicative of a map speed limit associated with the side road, and determining the speed limit to be not relevant if the speed limit matches the map speed limit associated with the side road and the stub distance is less than a predetermined stub distance threshold.

Optionally, the road feature may comprise a further traffic sign indicative of the speed limit, and the method may comprise determining whether the traffic sign and the further traffic sign span a side road in dependence on the location of the traffic sign with respect to the further traffic sign.

Optionally, the or each controller may be configured to determine the speed limit to be not relevant in dependence on the traffic sign and further traffic sign spanning a side road.

According to a further aspect, there is provided a computer-readable medium comprising computer software which, when executed, causes the performance of the above method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 2:
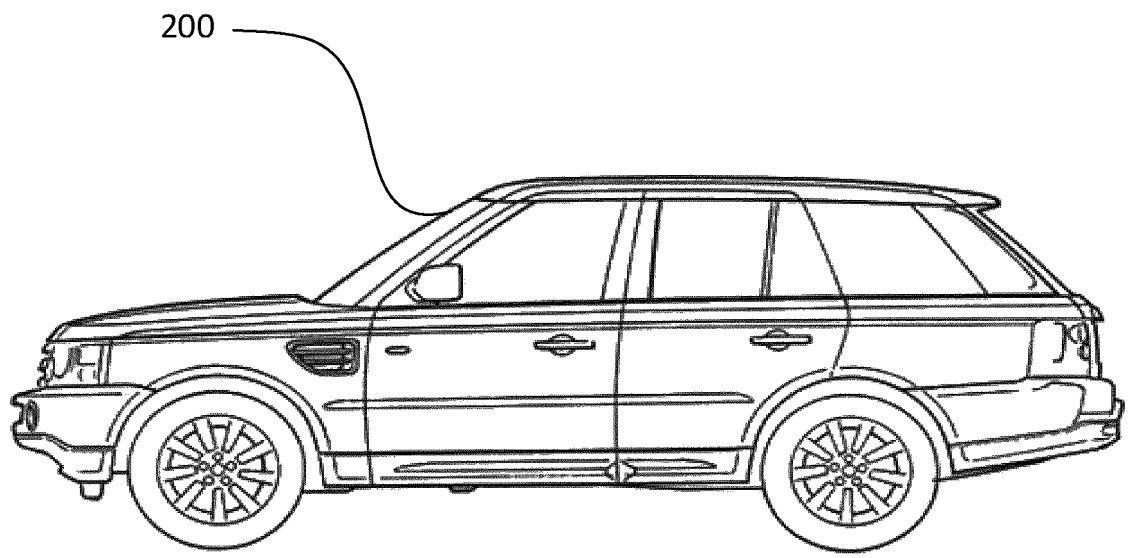
FIG. 2 shows a vehicle according to an embodiment.

A control system 110 in accordance with an embodiment of the present invention will now be described with reference to the accompanying figures. The control system 110 in an embodiment is a traffic sign recognition (TSR) system. The traffic sign recognition system is for generating a speed limit signal for controlling a vehicle in dependence on a relevance of a recognised traffic sign, as will be explained. As shown in FIG. 2, the control system 110 is installed in a vehicle 200. The vehicle 200 in the present embodiment is a wheeled vehicle, such as an automobile, but it will be understood that the control system 110 may be used in other types of land vehicle and watercraft which operate on speed limit controlled waterways.

Figure 1:
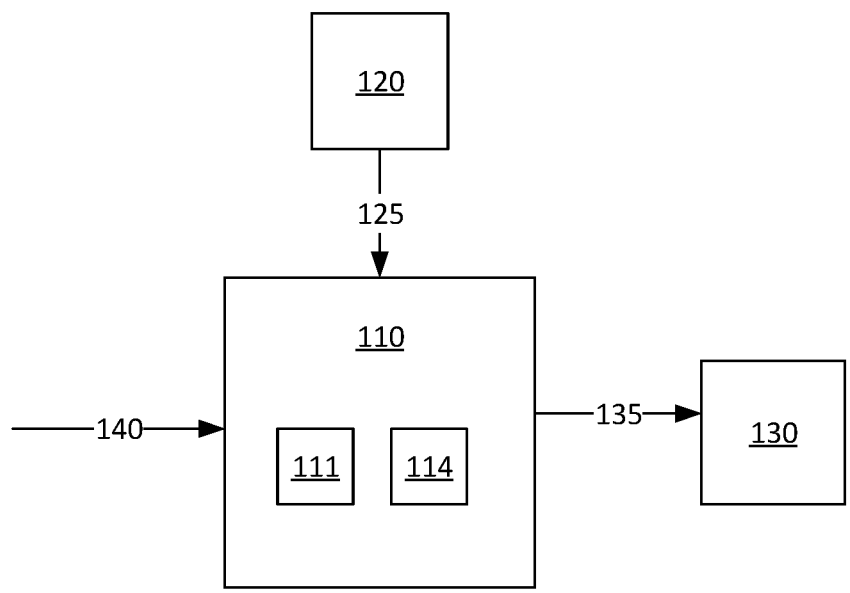
FIG. 1 shows a first schematic illustration of a control system according to an embodiment.

With reference to FIG. 1, the control system 110 is communicably coupled to a sensor unit 120 associated with the vehicle 200. The sensor unit 120 in the present embodiment comprises an optical camera having a field of view extending forwards in front of the vehicle 200. The sensor unit 120 may comprise one or more optical cameras, for example a stereo camera. Alternatively, or in addition, the sensor unit 120 may comprise other types of sensor, such as a radar system or a LIDAR system, to capture a representation of a region in front of the vehicle 200. The sensor unit 120 in the present embodiment is located behind a rear-view mirror (not shown) provided at the top of the front windshield of the vehicle 200. Other mounting locations are possible. For example the sensor unit 120 may be provided behind or in a front grille of the vehicle 200. The control system 110 is configured to receive image data 125 from the sensor unit 120 indicative of at least the region in front of the vehicle 200.

The control system comprises processing means 111 and memory means 114. The processing means may be one or more electronic processing devices 111. The memory means 114 may be one or more memory devices 114. The memory means 114 is electrically coupled to the processing means 111. The memory means 114 is configured to store instructions, and the processing means 111 is configured to access the memory means 114 and execute the instructions thereon.

Figure 3:
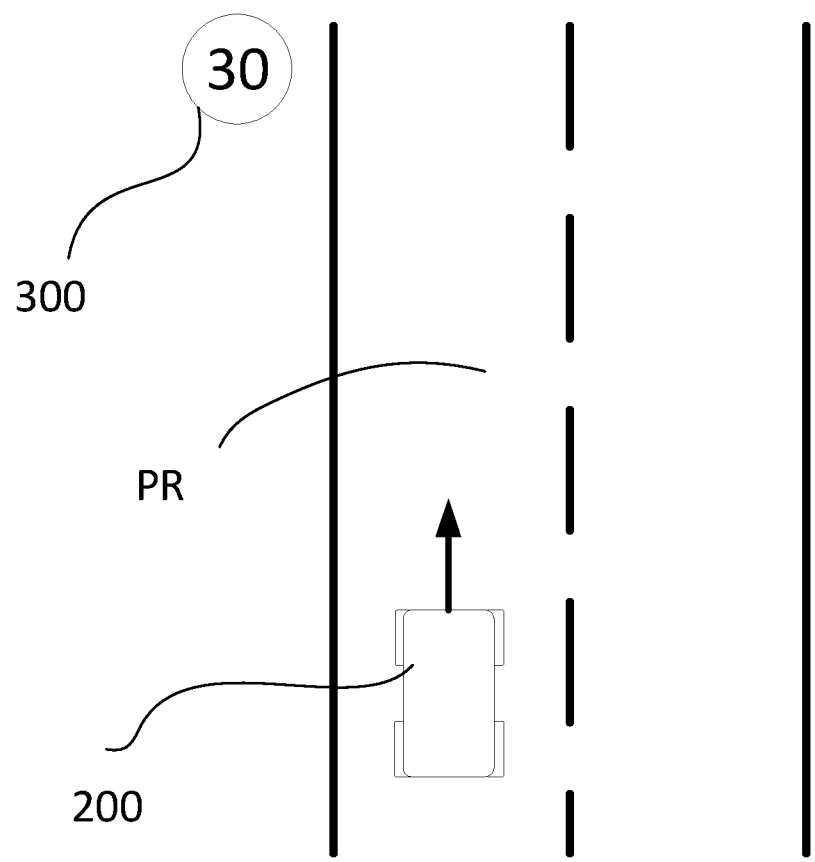
FIG. 3 illustrates the vehicle travelling on a primary road.

As illustrated in FIG. 3, the vehicle 200 is located on a road, henceforth referred to as a primary road PR. The control system 110 is configured to receive digital map data 140 indicative of the primary road PR. The digital map data 140 may be stored in memory 114 accessible to the control system 110 or may be transmitted to the control system 110 as the vehicle 200 travels along the primary road PR, for example from a remote map server. The digital map data 140 comprises an indication of a map speed limit associated with a segment of the primary road PR on which the vehicle is located. For example, the digital map data 140 may indicate that the vehicle 200 is located on a segment of the primary road PR with a speed limit of 40 km/h. The segment of the primary road may be defined between first and second nodes of the map data. The map speed limit may be utilised by one or more further vehicle control systems 130. The vehicle control systems 130 may comprise a cruise control system 130, which is arranged to operatively regulate a speed of the vehicle 200. Alternatively or additionally, the further vehicle control systems 130 may comprise a speed limit display system or a driver warning system for alerting the driver to the speed limit or warning the driver when the vehicle exceeds the speed limit.

In some instances, the digital map data 140 may be inaccurate. For example, the digital map data 140 may be out of date, or temporary speed limit restrictions may be in place due to road works for example. The control system 110 is thus configured to identify a traffic sign 300 in the received image data 125 and to determine a sign speed limit indicated by the traffic sign 300. The control system 110 may then output to the one or more further vehicle control systems 130 a sign speed limit signal 135 indicative of the sign speed limit i.e. the speed limit for the road segment conveyed or indicated by the road sign. In the embodiment illustrated in FIG. 3, the control system 110 may output a sign speed limit signal 135 indicative of a determined 30 km/h speed limit. Thus, the sign speed limit signal may override or supersede the map speed limit in a situation where the sign speed limit does not match the map speed limit. The further control systems 130 may then utilise the updated example 30 km/h speed limit, rather than the 40 km/h indicated by the digital map data.

In this way, a sign speed limit indicated by a traffic sign 300 detected by the sensor unit 120 may override the map speed limit. Vehicle control systems 130 such as a cruise control system 130 may then be able to account for recently changed speed limits and temporary speed limits which have not yet been reflected in the digital map data 140. Furthermore, the sign speed limit indicated by the traffic sign 300 may provide speed limit information where no map speed limit information is available, for example when the vehicle is on a road segment not present in the digital map data 140.

However, not every traffic sign detected by the sensor unit 120 is relevant to the vehicle 200. A traffic sign 300 may be defined as relevant to the vehicle 200 if it is associated with the primary road PR i.e. on which the vehicle is located.

Figure 4A:
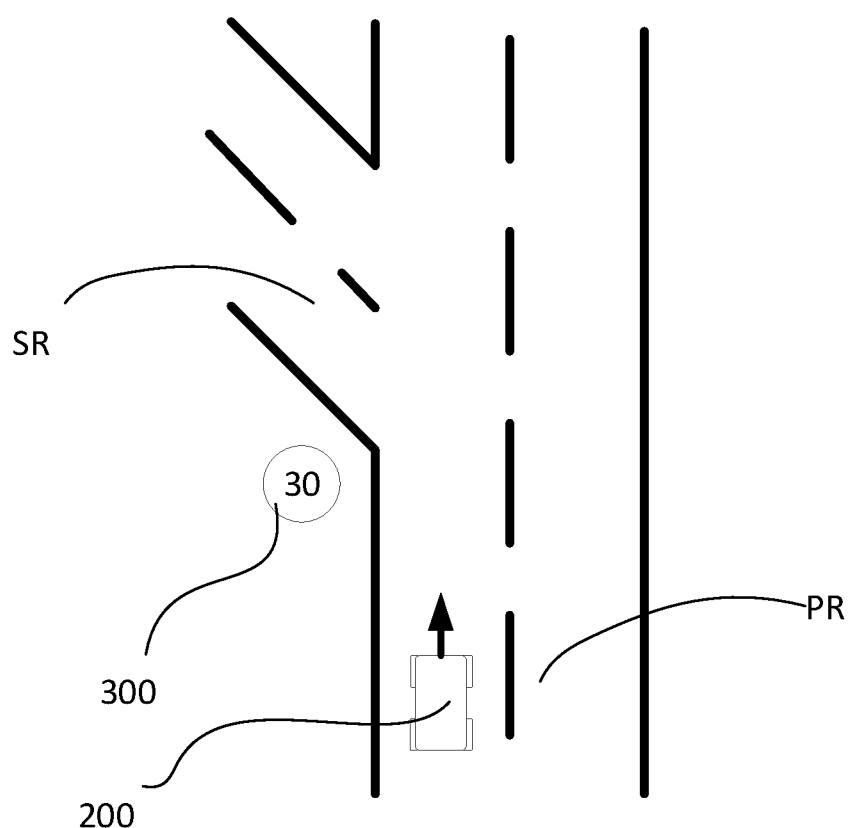
FIG. 4A illustrates a first type of side road adjoining the primary road.
Figure 4B:
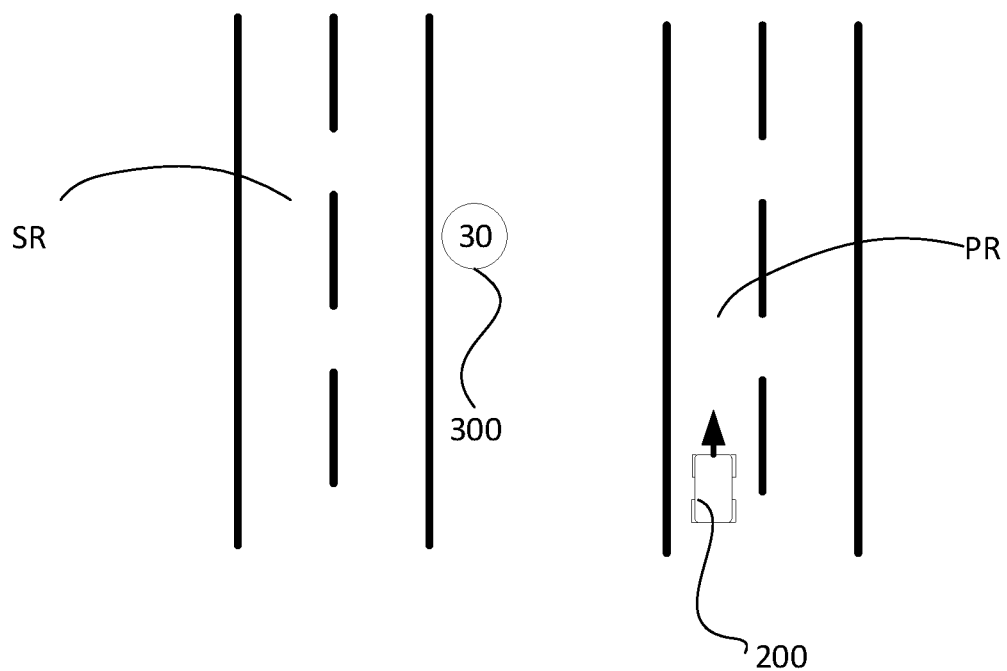
FIG. 4B illustrates a second type of side road not adjoining the primary road.

FIGS. 4A and 4B illustrate two examples of a traffic sign 300 which is not relevant to the vehicle 200. The traffic sign 300 may be associated with another road proximal to the primary road PR, such that a road sign associated with the other road is visible to the sensor unit 120. For example, the traffic sign 300 may be associated with a side road SR. Any road aside from the primary road may be referred to henceforth as a side road SR. The side road SR may be any road on which the vehicle is not located. In FIG. 4A, the side road SR is a road branching from the primary road PR. The side road SR may also be a road intersecting the primary road or diverting from the primary road PR at a junction, such as a roundabout or rotary. In some examples, the side road SR may be a road that does not meet the primary road at all. In FIG. 4B, the side road SR is a separate road substantially parallel to the primary road.

In each example of FIGS. 4A and 4B, the traffic sign 300 may be detected by the control system 110 of the vehicle 200 travelling on the primary road PR. However, each illustrated traffic sign 300 is associated with a side road SR, not the primary road PR. Thus, if the control system 110 outputs a sign speed limit signal indicative of the 30 km/h speed limit, this may erroneously override the correct 40 km/h speed limit for the primary road PR indicated by the digital map data, causing the vehicle systems to adjust control of the vehicle 200 unnecessarily.

Embodiments of the control system 110 are thus designed to determine whether the traffic sign 300 is relevant to the vehicle 200 at a time at which the sign is detected by the sensor unit 120. By relevant to the vehicle 200, it is meant whether the traffic sign 300 is associated with the primary road PR. If the traffic sign 300 is determined to be not relevant to the vehicle 200, for example due to being associated with a side road SR, the control system 110 may suppress or refrain from generating the sign speed limit signal 135.

Figure 5:
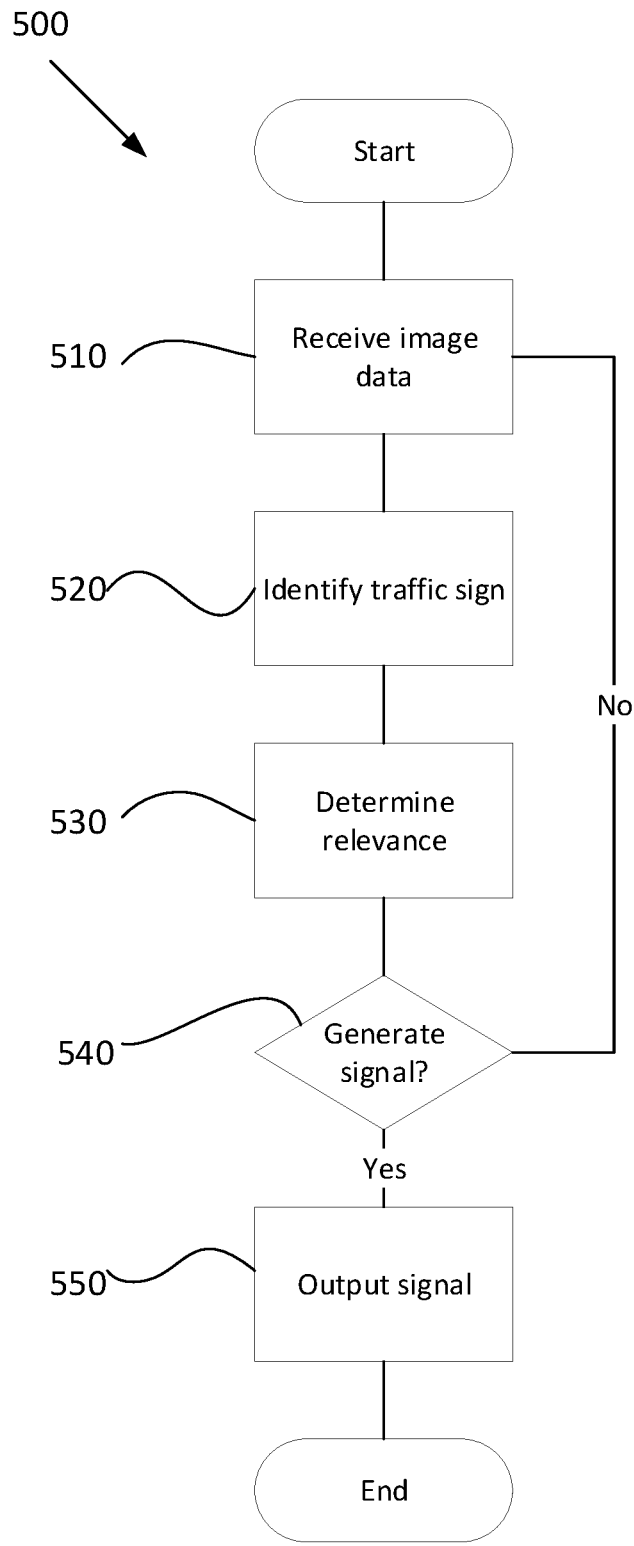
FIG. 5 illustrates a method according to an embodiment of the invention.

A method 500 of operation of the control system 110 according to an embodiment of the invention is illustrated in FIG. 5.

The method 500 comprises a block 510 for receiving image data indicative of an environment of the vehicle 200. The control system 110 may be configured to receive the image data 125 from the sensor unit 120, as discussed. The image data 125 may be indicative of the region in front of the vehicle 200 and may comprise a representation of one or more traffic signs 300 present in the image data.

The method 500 comprises a block 520 of identifying at least one traffic sign 300 in the image data 125. The traffic sign 300 may be identified by processing the image data 125 to search for predetermined shapes, colours and/or textures in the image matching known traffic sign criteria, as will be appreciated by the skilled reader. The block 520 further comprises determining a sign speed limit indicated by the traffic sign 300. The speed limit may be determined for example using any known image processing technique, such as using pictogram contours. For example, the block 520 may comprise identifying one traffic sign 300 in the image data 125 indicating a sign speed limit of 30 km/h.

The method 500 comprises a block 530 of determining a relevance of the sign speed limit to the vehicle 200. Determining a relevance may comprise classifying the speed limit as one of relevant or not relevant to the vehicle 200. The determined relevance may be indicative of a likelihood that the traffic sign is associated with the primary road PR. The speed limit may be classified as not relevant if it is determined to be likely that the traffic sign is applicable to a side road SR.

The sign speed limit may be determined as relevant or not relevant depending on a location of the traffic sign 300 with respect to a road feature in the environment. In different embodiments, the road feature may be one or more of: an edge of the primary road, an entrance stub to a side road or a further traffic sign, as will be explained. The location of the traffic sign with respect to the road feature may indicate a likelihood that the traffic sign is associated with a side road SR.

Figure 6:
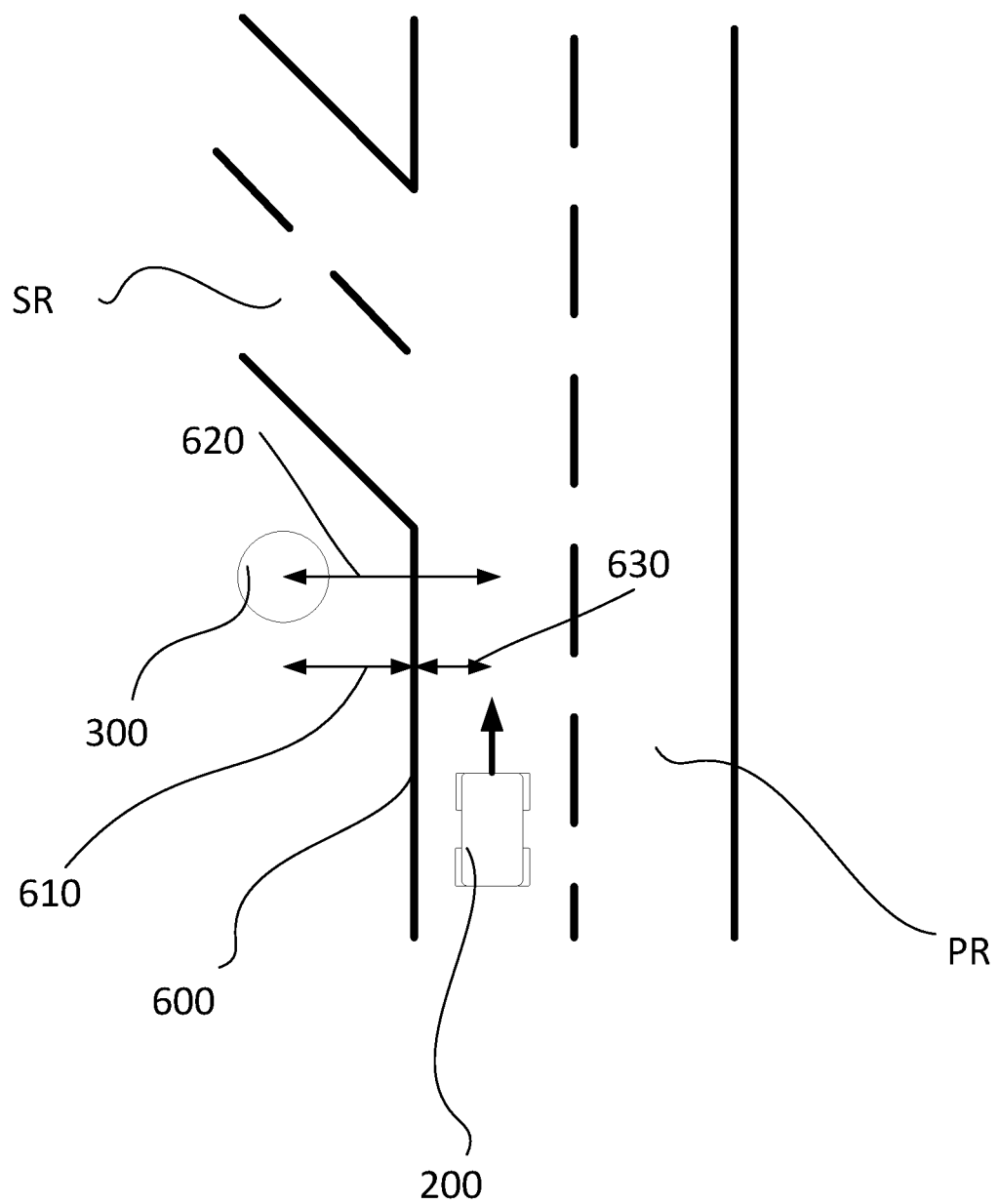
FIG. 6 illustrates a distance from a traffic sign to a road edge of the primary road.

With reference to FIG. 6, according to some embodiments block 530 comprises identifying a road edge 600 of the primary road PR. The road edge 600 may be identified in the image data 125, for example by identifying changes in the contrast and/or colour of the image data 125 which may be indicative of a road edge 600. For example, a transition or boundary may be identified between a road surface which may be relatively smooth (for example defined by asphalt, concrete or other surfacing material) and an adjacent surface which may be relatively rough (for example composed of one or more of the following: grass, mud, gravel, sand and snow). In other examples, a road edge 600 may be identified in dependence on road markings identified on the primary road PR, or a physical delineation or boundary such as a kerb.

The control system may then be configured to determine a distance 610 between the road edge 600 and the traffic sign 300. The distance may be a lateral distance 610, i.e. a distance substantially perpendicular to the road edge 600. The distance 610 may be determined from the image data 125 by determining a lateral distance 630 between the vehicle 200 and the road edge 600 and a lateral distance 620 between the vehicle 200 and the traffic sign 300. Each determined distance 620, 630 may be inferred from a size and/or location of the traffic sign 300 and road edge 600 in the image data 125, using known image processing techniques.

In block 530, the control system 110 may determine the speed limit to be not relevant to the vehicle if the determined lateral distance 610 between the road edge 600 and the traffic sign 300 meets a predetermined criterion. The predetermined criterion may be that the distance 610 is greater than or equal to a predetermined threshold. The predetermined threshold may be defined in dependence on where the vehicle 200 is located geographically, for example in dependence on which country the vehicle 200 is located within. Local regulations may define a standardised range of distances between a traffic sign 300 and a road edge 600. If the distance 610 is greater than an upper limit of the standardised range, it may be determined that the traffic sign 300 is not associated with the primary road PR because it is too distant from the road edge 600.

Figure 7:
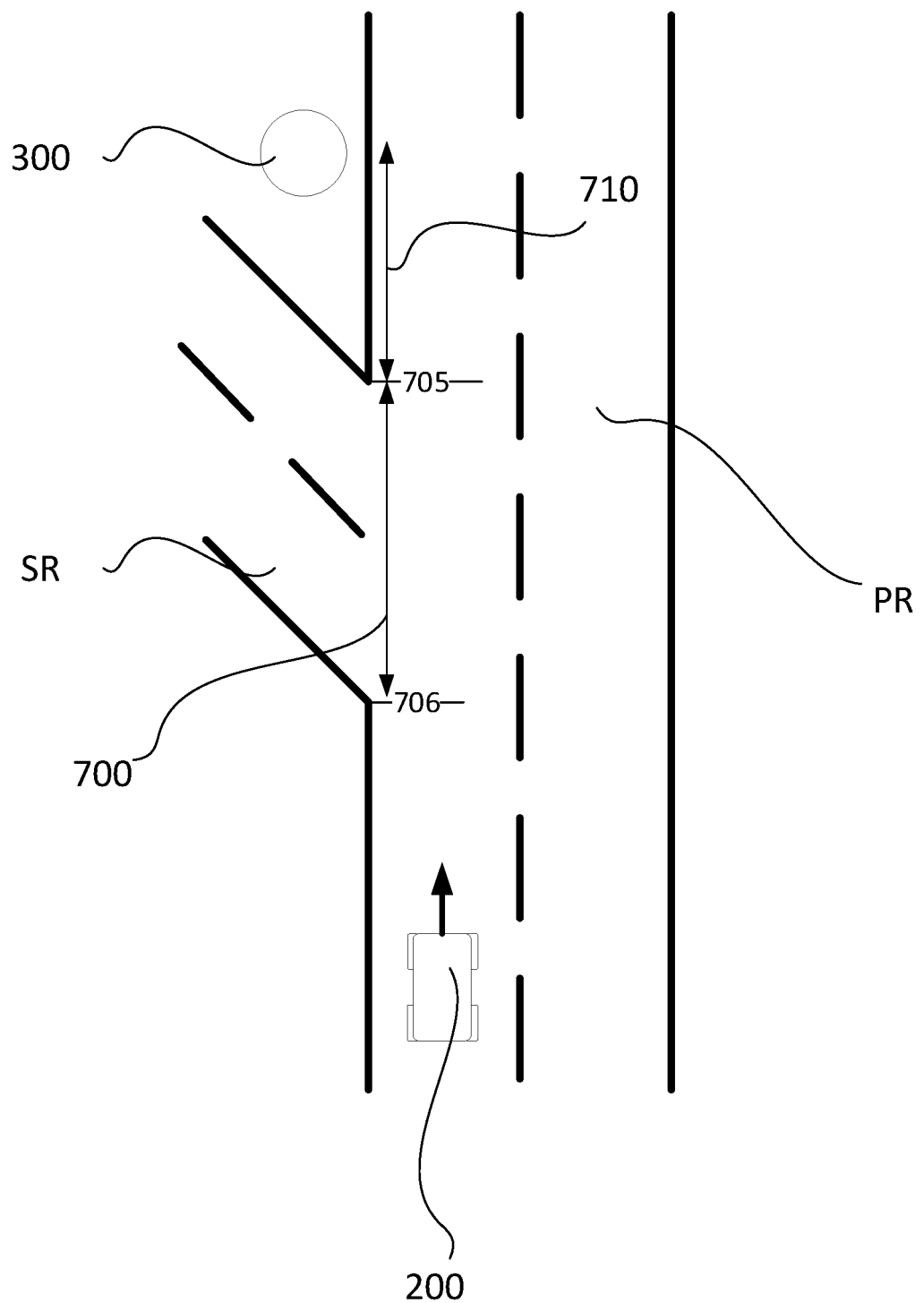
FIG. 7 illustrates a traffic sign proximal to an entrance stub to a side road.

According to some embodiments, the road feature may comprise an entrance stub to a side road SR. With reference to FIG. 7, an entrance stub 700 may be a region at which the side road SR meets the primary road PR. The entrance stub 700 may be a turn-off, an intersection, a slip lane, or any other junction. In some embodiments, block 530 may comprise identifying the entrance stub 700 in the image data 125. For example, the entrance stub 700 may be identified in the image data 125 by identifying a gap or divergence in the road edge 600. Alternatively, or additionally, the control system 110 may identify the location of the entrance stub 700 with respect to the vehicle 200 in dependence on the digital map data 140. The digital map data 140 may indicate a location of a node at which a side road SR segment diverges from the segment of primary road PR on which the vehicle 200 is located.

In block 530, the control system 110 may determine a stub distance 710 from the traffic sign 300 to the entrance stub 700. A location of one or more boundaries 705, 706 defining the edge of the entrance stub 700 may be identified from the image data 125 or the digital map data 140. The stub distance 710 may then be determined as a distance between the traffic sign 300 and the closest boundary 705, 706 to the traffic sign. In the illustrated embodiment, the traffic sign 300 is positioned after the entrance stub 300 along the primary road PR with respect to the direction of travelled of the vehicle 200 and the closest boundary is the boundary 705. However, if the traffic sign 300 is positioned before the entrance stub 700, the closest boundary to the traffic sign 300 may be the boundary 706. According to some embodiments, the stub distance 710 may be defined as a distance from the traffic sign 300 to an alternative point on the entrance stub 700, for example a mid-point of the entrance stub 700.

The digital map data 140 may indicate a map speed limit associated with the side road SR. In block 540, the control system 110 may determine whether the map speed limit associated with the side road matches the sign speed limit. If the map speed limit associated with the side road matches the sign speed limit, this may indicate that the traffic sign 300 is associated with the side road SR, and thus is not relevant to the vehicle 200.

To more accurately ensure that the traffic sign 300 is associated with the side road SR, the control system 110 may be configured to determine whether the stub distance 710 is less than a predetermined stub distance threshold, that is whether the traffic sign 300 is located sufficiently close to the entrance stub 700. If the stub distance 710 is less than the stub distance threshold, and the map speed limit associated with the side road matches the sign speed limit, the control system 110 may determine that the traffic sign 300 is associated with the side road SR and thus is not relevant to the vehicle 200.

Figure 8:
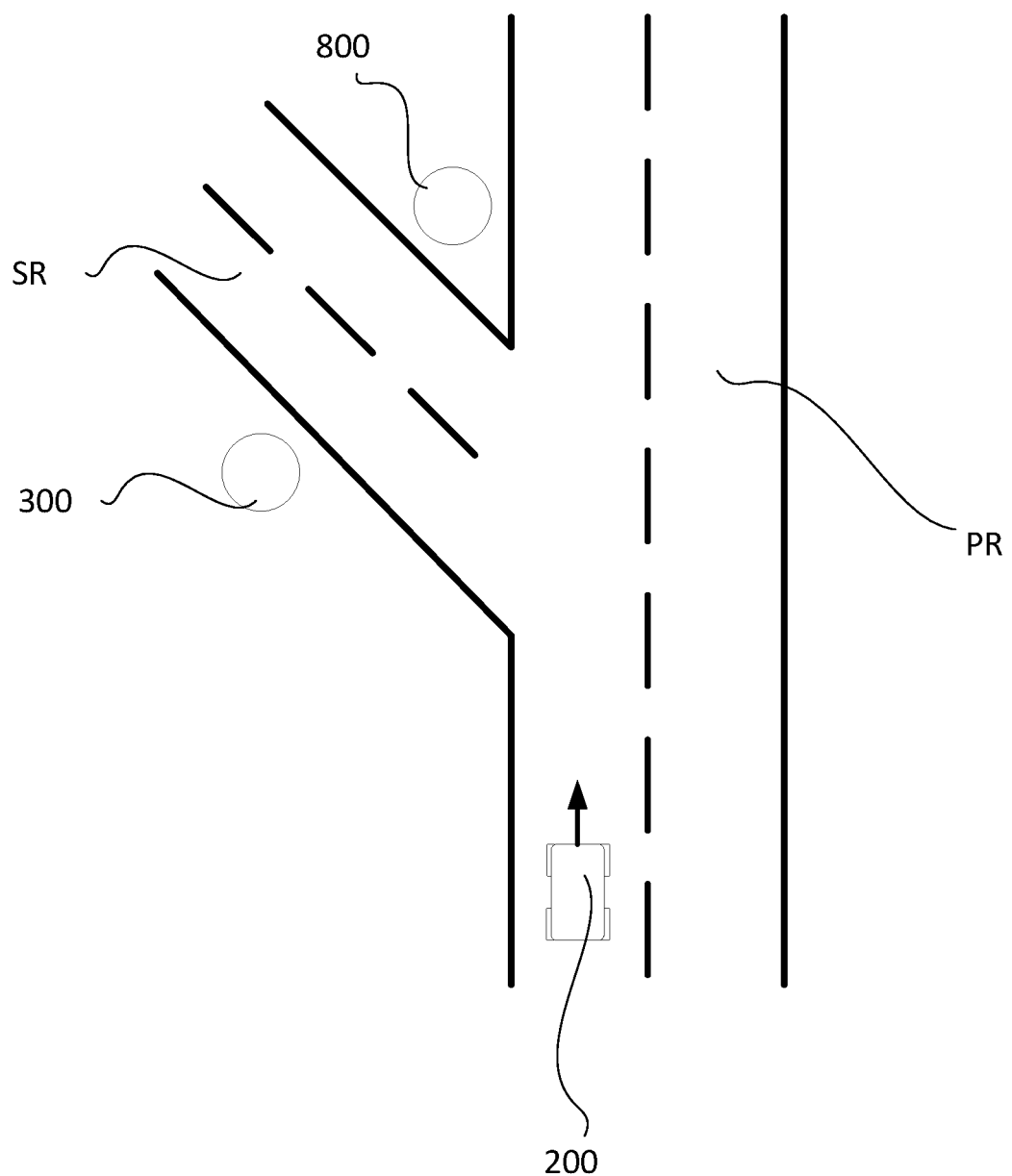
FIG. 8 illustrates two traffic signs spanning a side road.

With reference to FIG. 8, according to some embodiments the control system 110 may be configured to determine that the traffic sign 300 is not relevant to the vehicle 200 in dependence on its location with respect to a further traffic sign 800. If a first traffic sign 300 and second traffic sign 800 are each identified by the control system 110, in block 530 the control system 110 may determine whether the first traffic sign 300 and the second traffic sign 800 span a side road SR.

In FIG. 8, the first traffic sign 300 and second traffic sign 800 are illustrated spanning the side road SR. By spanning the side road SR, it is meant that the first traffic sign 300 and the second traffic sign 800 are located on opposing sides of the side road SR and are generally aligned along an axis perpendicular to the side road SR. A pair of traffic signs 300, 800 as illustrated may be referred to as gated signs. Such gated signs may often be used to indicate a change in speed limit, and the provision of a traffic sign on each side of the road enables a driver to readily deduce to which road the traffic signs relate. By determining that the first and second traffic signs 300, 800 span a side road, it may be inferred that each of the first and second traffic signs 300, 800 are associated with the side road SR and thus are not relevant to the vehicle 200.

The first traffic sign 300 and the second traffic sign 800 are determined to span the side road SR if one or more spanning criteria are met. A first spanning criterion may be that the first traffic sign 300 and second traffic sign 800 are indicative of the same speed limit. A second spanning criterion may be that each of the first traffic sign 300 and second traffic sign 800 are each located to a same side of the vehicle 200. A third spanning criterion may be that a distance between the first traffic sign 300 and the second traffic sign 800 is below a threshold, i.e. that the traffic signs 300, 800 are sufficiently close together.

Figure 9:
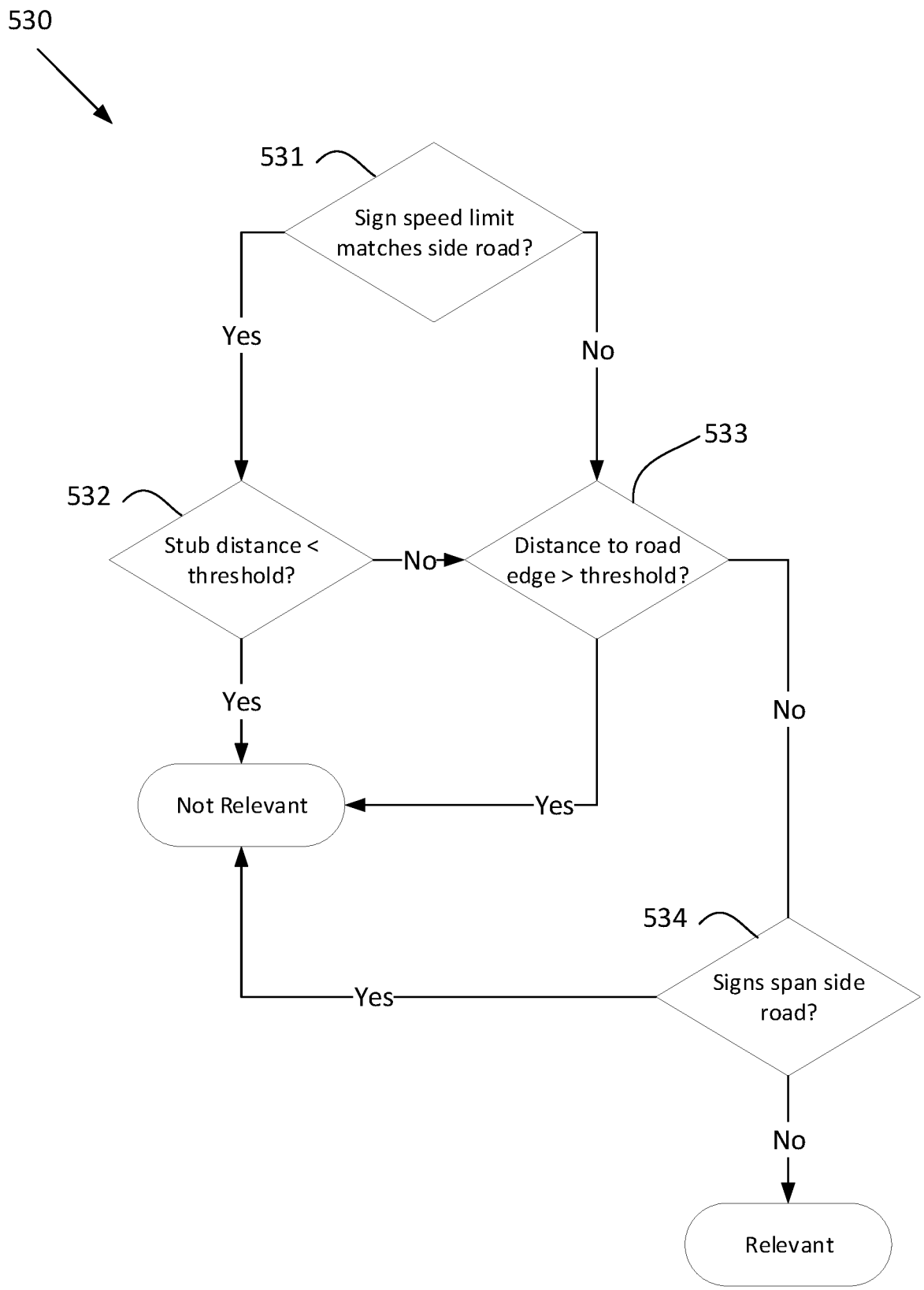
FIG. 9 illustrates a method of determining relevance according to an embodiment of the invention.

The methods described above for determining the relevance of a traffic sign 300 to the vehicle 200 may be performed in isolation or in combination. An example operation of the control system 110 during block 530 according to an embodiment is illustrated in FIG. 9. In the illustrated embodiment, the control system 110 performs each of the above-described methods in sequence to determine a relevance of the traffic sign 300 to the vehicle 200.

In step 531, it is determined whether the sign speed limit matches a map speed limit associated with a side road SR. If the sign speed limit matches the map speed limit, in step 532 is determined whether the stub distance 710 to the entrance stub 700 of the side road SR is less than a threshold. If the stub distance 710 is less than the stub distance threshold, the traffic sign 300 is determined to be associated with the side road SR of the stub entrance and thus not relevant to the vehicle. If the traffic sign 300 is not determined to be associated with a stub entrance 700, the control system 110 proceeds to step 533. In step 533, it is determined whether a distance 610 between the traffic sign 300 and the road edge 600 of the primary road is greater than a threshold. If the distance 610 is greater than the threshold, the traffic sign 300 may be determined to be not relevant to the vehicle 200. If the traffic sign is sufficiently close to the road edge 600, the control system 110 proceeds to step 534. In step 534 it is determined whether the traffic sign 300 spans a side road SR with a further traffic sign 800. If the traffic sign 300 is determined to form part of a pair spanning a side road, the traffic sign 300 is determined to be not relevant to the vehicle 200. If the traffic sign 300 is determined to not be associated with a side road SR or not be too distant from the road edge 600 in any of steps 531 to 534, it may be determined likely that the traffic sign 300 is associated with the primary road PR, and the traffic sign 300 is determined relevant to the vehicle 200.

It will be appreciated that in some embodiments, the steps 531 to 534 may be performed in an alternative order. Furthermore, one or more of the steps 531 to 534 may be omitted in some embodiments. For example, in one embodiment, in block 530 the control system may only perform step 533, and the traffic sign 300 may be determined to be relevant if it is sufficiently close to the road edge 600.

The method 500 comprises a block 540 for selectively generating a sign speed limit signal indicative of the speed limit of the traffic sign 300. The sign speed limit signal may be selectively generated in dependence on the traffic sign 300 being determined to be relevant to the vehicle 200 in block 530. If the traffic sign 300 is not relevant to the vehicle, in block 540 the control system 110 may determine not to generate a signal. Alternatively, the control system 110 may generate a map speed limit signal indicative of the map speed limit for the primary road PR indicated in the digital map data 140. The method 500 comprises a block 550 for outputting the generated signal to one or more further vehicle control systems 130. The one or more vehicle control systems 130 may comprise a cruise control system, a display or alert system to inform the driver of the speed limit.

Thus, by implementing the method 500, the traffic sign recognition system may only override the speed limit taken from digital map data if it has been determined that the traffic sign identified is relevant to the vehicle. Traffic signs associated with side roads on which the vehicle 200 is not travelling may be effectively filtered, and erroneous adjustment in speed limit input to the further vehicle systems 130 such as cruise control systems 130 may be mitigated.

Figure 10:
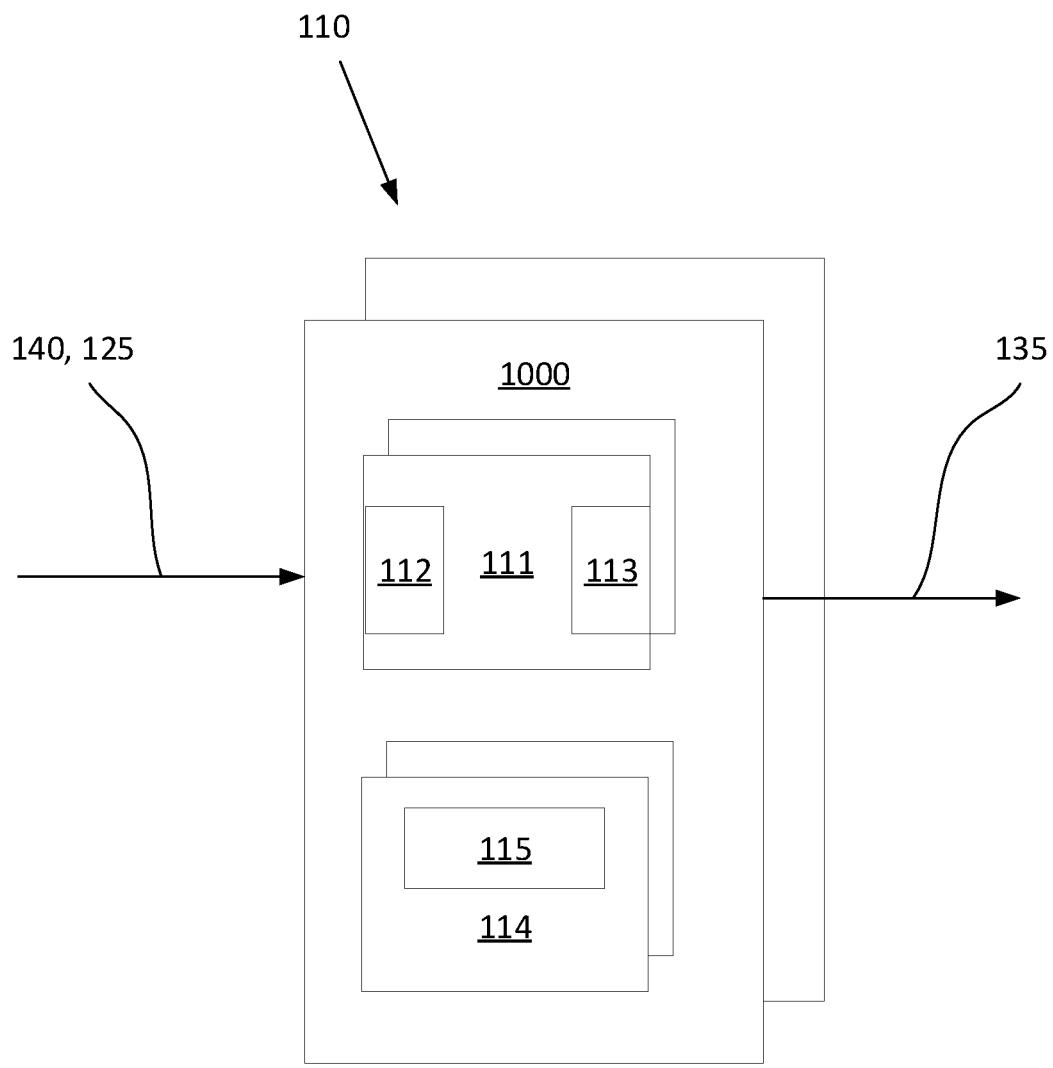
FIG. 10 shows a second schematic illustration of a control system according to an embodiment.

With reference to FIG. 10, there is illustrated a simplified example of a control system 110 such as may be adapted to implement the method described herein. The control system 110 comprises one or more controllers 1000 and is configured to generate a speed limit signal 135 for controlling a vehicle 200. The control system 110 is configured to receive, from one or more imaging devices 120 associated with the vehicle, image data 125 indicative of an environment of the vehicle. The control system 110 is configured to determine, in dependence on the image data 125, a speed limit indicated by a traffic sign 300 and a location of the traffic sign with respect to a road feature in the environment. The control system 110 is configured to determine a relevance of the speed limit to the vehicle in dependence on the determined location of the traffic sign 300 and a determined location of the vehicle 200, selectively generate a sign speed limit signal 135 indicative of the speed limit in dependence on the determined relevance; and output the selectively generated signal 135 to at least one vehicle control system 130.

It is to be understood that the or each controller 1000 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 1000 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 1000 to implement the control techniques described herein (including some or all of the functionality required for the method described herein). The set of instructions could be embedded in said one or more electronic processors of the controller 1000; or alternatively, the set of instructions could be provided as software to be executed in the controller 1000. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 10, the or each controller 1000 comprises at least one electronic processor 111 having one or more electrical input(s) 112 for receiving one or more input signals, and one or more electrical output(s) 113 for outputting one or more output signals. The or each controller 1000 further comprises at least one memory device 114 electrically coupled to the at least one electronic processor 111 and having instructions 115 stored therein. The at least one electronic processor 111 is configured to access the at least one memory device 114 and execute the instructions 115 thereon.

The, or each, electronic processor 111 may comprise any suitable electronic processor (e.g., a microprocessor, a microcontroller, an ASIC, etc.) that is configured to execute electronic instructions. The, or each, electronic memory device 114 may comprise any suitable memory device and may store a variety of data, information, threshold value(s), lookup tables or other data structures, and/or instructions therein or thereon. In an embodiment, the memory device 114 has information and instructions for software, firmware, programs, algorithms, scripts, applications, etc. stored therein or thereon that may govern all or part of the methodology described herein. The processor, or each, electronic processor 111 may access the memory device 114 and execute and/or use that or those instructions and information to carry out or perform some or all of the functionality and methodology describe herein.

The at least one memory device 114 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 1000 have been described comprising at least one electronic processor 111 configured to execute electronic instructions stored within at least one memory device 114, which when executed causes the electronic processor(s) 111 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for generating a speed limit signal for a vehicle, the control system comprising at least one controller that is configured to:
   receive, from one or more imaging devices associated with the vehicle, image data indicative of an environment of the vehicle;
   determine, in dependence on the image data, a speed limit indicated by a traffic sign and a location of the traffic sign with respect to a road feature in the environment;
   determine a relevance of the speed limit to the vehicle in dependence on the determined location of the traffic sign and a determined location of the vehicle;
   generate a sign speed limit signal indicative of the speed limit in dependence on the determined relevance; and
   output the generated sign speed limit signal to at least one vehicle control system,
   wherein the road feature comprises an entrance stub to a side road, and wherein the at least one controller is configured to determine the location of the traffic sign by determining a stub distance from the traffic sign to the entrance stub of the side road.

2. The control system according to claim 1, wherein the at least one controller is configured to:
   receive digital map data comprising an indication of a map speed limit associated with a road segment on which the vehicle is located; and
   if the speed limit indicated by the traffic sign is determined to be not relevant, generate a map speed limit signal indicative of the map speed limit and output the map speed limit signal to the at least one vehicle control system.

3. The control system according to claim 2, wherein if the speed limit indicated by the traffic sign is determined to be relevant, the at least one controller is configured to preferentially output the sign speed limit signal.

4. The control system according to claim 1, wherein determining the location of the traffic sign comprises determining a distance from the traffic sign to the road feature.

5. The control system according to claim 4 wherein the at least one controller is configured to determine the relevance of the speed limit in dependence on whether the distance meets a predetermined criterion.

6. The control system according to claim 4, wherein the road feature comprises an edge of the road on which the vehicle is located, and wherein determining the location of the traffic sign comprises determining a distance from the traffic sign to the edge of the road.

7. The control system according to claim 6, wherein the at least one controller is configured to determine the speed limit to be not relevant to the vehicle if the determined distance to the edge of the road is greater than a predetermined threshold.

8. The control system according to claim 1, wherein the at least one controller is configured to:
   receive digital map data indicative of a map speed limit associated with the side road; and
   determine the speed limit to be not relevant if the speed limit matches the map speed limit associated with the side road and the stub distance is less than a predetermined stub distance threshold.

9. The control system according to claim 1, wherein the road feature comprises a further traffic sign indicative of the speed limit.

10. The control system according to claim 9, wherein the at least one controller is configured to determine whether the traffic sign and the further traffic sign span a side road in dependence on the location of the traffic sign with respect to the further traffic sign.

11. The control system according to claim 10, wherein the at least one controller is configured to determine the speed limit to be not relevant if the traffic sign and further traffic sign span a side road.

12. The control system according to claim 1, wherein the at least one controller comprises:
   an electrical input for receiving an electrical signal indicative of the image data;
   an electrical output for outputting an electrical signal indicative of the speed limit; and
   one or more electronic processors for operatively executing computer-readable instructions to determine the relevance of the speed limit.

13. A vehicle comprising the control system according to claim 1.

14. A computer-implemented method for generating a speed limit signal for control of a vehicle, the method comprising:
   receiving, from one or more imaging devices associated with the vehicle, image data indicative of an environment of the vehicle;
   determining, in dependence on the image data, a speed limit indicated by a traffic sign and a location of a traffic sign with respect to a road feature in the environment;
   determining a relevance of the speed limit to the vehicle in dependence on the determined location of the traffic sign and a determined location of the vehicle;
   selectively generating a sign speed limit signal indicative of the speed limit in dependence on the determined relevance; and
   outputting the selectively generated signal to at least one vehicle control system,
   wherein the road feature comprises an entrance stub to a side road, and wherein the a least one controller is configured to determine the location of the traffic sign by determining a stub distance from the traffic sign to the entrance stub of the side road.

15. A non-transitory computer-readable medium comprising computer software which, when executed by at least one processor, causes the at least one processor to perform the method of claim 14.

* * * * *